July 24, 1962  R. C. ECK  3,045,627
DEPTH CONTROL SYSTEM
Filed May 24, 1956
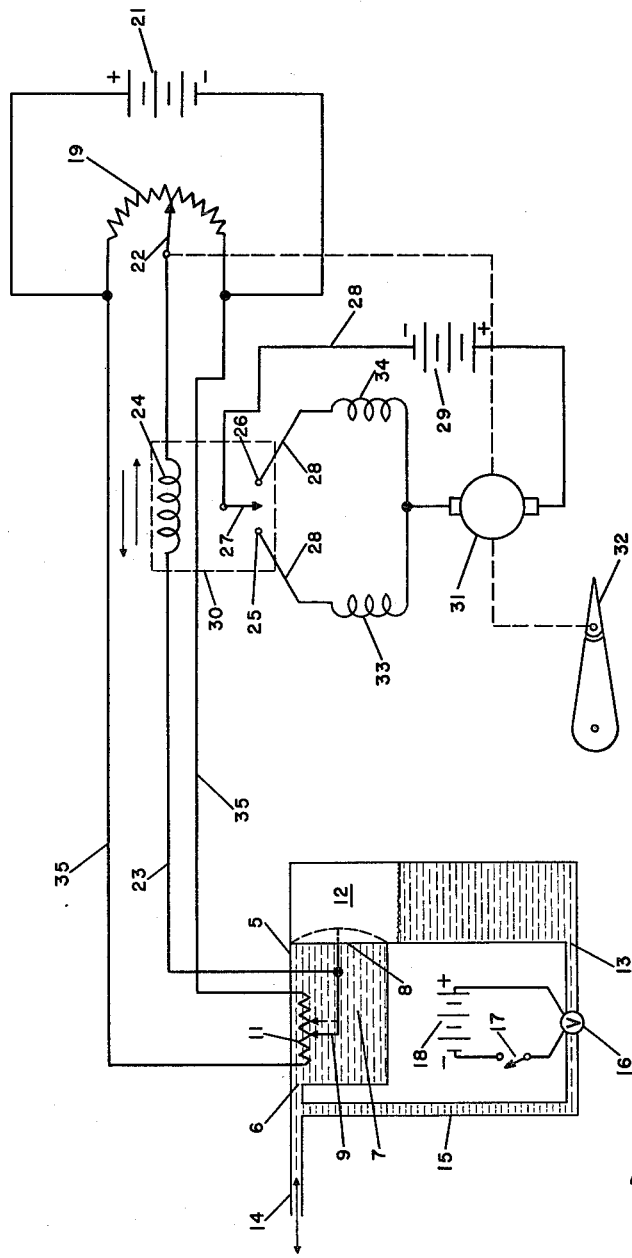
ROBERT C. ECK
*INVENTOR.*
BY
ATTORNEYS

United States Patent Office 3,045,627
Patented July 24, 1962

3,045,627
DEPTH CONTROL SYSTEM
Robert C. Eck, State College, Pa., assignor, by mesne assignments, to the United States of America as represented by the Secretary of the Navy
Filed May 24, 1956, Ser. No. 587,180
10 Claims. (Cl. 114—25)

My invention relates in general to depth control systems for conveyances moving through a fluid medium and more particularly to an electro-mechanical system for proportional depth control.

In many of the previous depth control systems for submersible bodies a bellows or diaphragm subject to hydrostatic pressure ambient of the body is used to maintain depth in conjunction with a pendulum operable to override the bellows mechanism to maintain a constant or zero pitch of the body. The bellows mechanism is generally biased by a fixed spring or the like to provide control until the body has reached a previously determined depth thus effectively preventing continuous use of the body at different depths with a single depth control system. This system functions satisfactorily at relatively small depths but becomes unsatisfactory at greater depths due to the fact that the bellows mechanism, or a Bourdon type mechanism which is generally used for high pressures, must be made proportionally stronger to withstand the increased pressure hence its sensitivity is proportionally less.

Due to hysteresis, friction, resolution errors and temperature changes, prior art pressure transducers or pressure error sensing systems have an indicating error of about ±3 percent. When, for example, this error is considered in terms of feet of seawater, prior depth control systems utilizing a pressure transducer designed and adapted for operation at a depth of 500 feet have a maximum error of about ±15 feet, or, to say it another way, such systems will allow variations in depth of as much as 30 feet before an error can be detected. For travel at 1,000 feet, this variation in depth would be increased to 60 feet.

Use of acoustic detection systems in underwater bodies, such as for example, towed bodies operating at great depths have heretofore been seriously limited due to the inability to quickly and easily vary the depth of the body and keep it at a substantially constant depth once that depth has been attained. Also, the safety of the towing vehicle and the towing speeds of such bodies have heretofore been seriously limited due to the strain imposed on the towing cable and associated mechanism by variations in depth of the towed body.

Further, electro-hydraulic and hydraulic systems have the additional disadvantages of their substantial weight and volumetric displacement and the complexity and cost of their construction.

In accordance with my invention, I provide a sensitive pressure error sensing transducer having a small total range adapted to allow the selection of various reference or static pressures without materially affecting the linearity of the transducer in combination with controlling means to vary the rudders or elevators of a sub-aqueous body whereby the rudders or elevators are varied in accordance with still smaller variations in pressure from the selected reference pressure to keep the body within about ±1 foot or less of the desired depth of travel. As used herein "rudder" and "elevator" mean any surface or means, wherever located, that is adapted to cause the body to change its position or direction of travel.

The maximum controlled depth of travel of a sub-aqueous body incorporating my invention is substantially determined by the construction of the pressure transducer as is more fully explained later herein and for all practical purposes is substantially unlimited. Further, the depth of travel of a sub-aqueous body incorporating my invention may be changed from substantially zero depth to maximum depth while it is in motion without materially affecting the sensitivity of the system or first removing the body from the water to make the necessary adjustments.

It is accordingly the principal object of my invention to provide a depth control system having increased sensitivity at substantial depths.

Another object of my invention is to provide a depth control system whereby a new operating depth may be quickly selected and maintained without raising or removing the body from the water.

A further object of my invention is to provide a depth control system wherein the sensitivity or degree of control remains substantially the same from zero to maximum depth.

A still further object of my invention is to provide a depth control system that will hold a sub-aqueous body to within about ±1 foot of a selected depth of travel for the entire range of the system.

Another object of my invention is to provide an improved error pressure sensing transducer for use with a depth control system usable at substantially any depth.

Another object of my invention is to provide improved positive proportional rudder control at various depths when the depth of travel of a sub-aqueous body is changed.

A still further object of my invention is to provide improved depth control of a towed submersible body whereby the tension on the towing cable may be held substantially constant.

Another object of my invention is to provide an improved depth control system for towed submersible bodies whereby the body may be towed at high speeds with increased safety to both the towing vehicle and the body.

These and other objects of my invention together with their incident advantages will be more readily understood and appreciated from the following detailed description of a preferred embodiment thereof selected for purposes of illustration and shown in the accompanying drawing which illustrates diagrammatically an embodiment of my invention.

Referring now more particularly to the drawing, the pressure transducer or pressure error sensing means indicated generally by the reference numeral 5, has an inlet port 6 through which hydrostatic pressure may be transmitted to the interior of compartment 7, within which it acts on a highly resilient diaphragm 8. The diaphragm 8 may be mounted transversely of and in obstructing relation across one end of compartment 7 to sealably close off one end of the compartment. A contacting member 9 is preferably rigidly connected to the center portion of diaphragm 8 and is disposed for sliding engagement in electrical contact with resistor 11 which may be rigidly mounted in compartment 7 in any suitable manner. A compartment 12 having an inlet port 13 is associated with compartment 7 whereby the diaphragm 8 may flex inwardly into or outwardly from compartment 12 while additionally providing a watertight seal between compartment 7 and compartment 12. A pipe 14 continuously open to the ambient hydrostatic pressure is connected to inlet port 6. Pipe 15 having one end connected to pipe 14 is connected to inlet port 13. Disposed intermediate the ends of pipe 15 is a solenoid valve 16 adapted to close off compartment 12 from the hydrostatic pressure ambient of the body. A switch 17 and source of electrical current 18 is connected in series with the solenoid valve whereby current may be supplied to the holding coil of the valve to activate the solenoid valve thereby preventing hydrostatic pressure from being applied to the interior of compartment 12. The diaphragm 8 is preferably a relatively thin and resilient material such as beryllium copper, Phosphor bronze, or the like which is sensitive to the application of a relatively small amount of pressure. Although the volume of compartment 7 is not critical the volume of compartment 12 is considered critical to the maintenance of linearity of the system. As may now be obvious, when valve 16 is open, diaphragm 8 will remain stationary when the body is either ascending or descending because the pressure on both sides of diaphragm 8 will be the same. As the hydrostatic pressure ambient of the body increases with an increase in depth water will be forced into compartment 12 thus compressing the air trapped in compartment 12 until the pressure on diaphragm 8 equals the hydrostatic pressure ambient of the body, which is to say the pressure on the opposite side of diaphragm 8. Due to the relatively high pressures encountered even at small depths this action is sufficiently quick that for even a rapid change in depth little or no pressure differential will occur. However, when valve 16 is closed, a reference depth pressure is secured in compartment 12. When the body now for example increases in depth, diaphragm 8 may easily flex inwardly (as shown in phantom in the drawing), due to the unfilled portion of compartment 12 and the increased pressure in compartment 7, and when the body decreases in depth, the reverse will occur due to the pressure of the elastic medium trapped in compartment 12. It is necessary that a sufficient volume of a pressure medium that is elastic in expansion and compression be trapped on the reference side of transducer 5 so that various reference pressures can be easily and quickly secured and diaphragm 8 will be able to uniformly and quickly respond to small changes in hydrostatic pressure at substantially any depth. In order to secure this result, it is necessary to consider the maximum volumetric displacement of diaphragm 8 and the compression ratio of the medium at maximum operating depth and zero operating depth. Compartment 12 provides a reservoir of trapped air or the like as an elastic medium on the reference pressure side. The size of compartment 12 is determined by the maximum desirable operating depth and the maximum volumetric displacement of diaphragm 8. This may be easily determined by using the formula $$P_1 V_1 = P_2 V_2$$

where $P_1$ is atmospheric pressure, $V_1$ is the desired total volume of compartment 12, $P_2$ is the hydrostatic pressure at the maximum desired operating depth, and $V_2$ is the unfilled volume of compartment 12 at the maximum desirable operating depth. If at the maximum desirable operating depth the remaining air volume in compartment 12 is about 15 times the full scale volumetric displacement of diaphragm 8 at maximum depth deviation, the system can be considered linear, and the operation of transducer 5 will be substantially proportional to depth variation. Although I have indicated that a ratio of 15:1 is preferable for the relation of the minimum air space of compartment 12 to the maximum volumetric displacement of diaphragm 8, it is to be noted that this ratio may vary, an increase thereof having but little beneficial effect upon the linearity of the system and a decrease resulting in a progressively less linear system. In view of the above it may be readily obvious that various specific means and arrangements may be employed for the construction of transducer 5.

An example of such operating on the same principle as described hereinabove would be the substitution of a suitable bellows for diaphragm 8 mounted in a compartment comparable to compartment 7 containing the contact member 9 and resistor 11 as previously described and having a highly flexible diaphragm such as rubber or the like separating this compartment from a compartment comparable to compartment 12. If the hydrostatic pressure is supplied to the interior of the bellows and the compartment containing the bellows and resistor is filled with a fluid such as, for example, silicone oil, substantially the same results will be secured. This will be true even when the compartment comparable to compartment 12 is located directly above the bellows since the weight of the water and silicone oil will not be sufficient to affect the sensitivity of the bellows.

Due to the deleterious effect of salt water and the impurities in so-called pure water, it is preferable that such not be allowed to come in contact with the contact member 9 and resistor 11. If so desired, this result may be easily attained by sealably mounting in any suitable manner a highly flexible diaphragm such as rubber or the like between inlet port 6 and resistor 11. If the space containing resistor 11 and contact element 9 is completely filled with some inert fluid such as silicone oil, no deterioration will occur and the hydrostatic pressure will be transmitted to diaphragm 8 without any loss or distortion.

Further, resistor 11 and contact element 9 may be located on the reference pressure side of diaphragm 8 and the hydrostatic pressure applied to the other side if proper precautions are taken to prevent the water from coming into contact with resistor 11.

The electric circuit illustrated in the drawing is a Wheatstone bridge arrangement wherein resistors 11, 19 form the arms of the bridge, the current thereto being supplied through wires 35 by a source of current such as for example battery 21. The arms 9—22 of resistors 11, 19 are connected by wire 23 with the winding 24 of a change-over relay 30. The two contacts 25, 26 of relay 30 are connected by a switch 27 and wires 28 with a source of current such as battery 29 and with the electric motor 31 which is arranged for simultaneously shifting a rudder 32 and contact element 22. The motor 31 has two windings 33, 34 which are connected with the contacts 25, 26 of the change-over relay 30 by means of wires 28 and on being excited, turn the rotor of the motor 31 clockwise as well as counter-clockwise, whereby the rudder 32 and contact element 22 are adjusted correspondingly.

Although I have shown a Wheatstone bridge at the preferred type of control it may now be readily obvious that such may be easily replaced by any other conventional proportional or "on-off" system utilizing either A.C. or D.C. current, or a pneumatic or hydraulic amplification means. Although I have found that use of my depth control system on towed submersible bodies eliminates the necessity of pendulum or rate of change signal means for anticipation of stratum deviations before they occur, it is to be understood that such may be included as a further refinement if so desired.

This device operates in the following manner:

In ascending or descending, solenoid valve 16 remains open so that water will enter compartment 12 compressing the air trapped thereinabove thus keeping the pressure on both sides of diaphragm 8 equal. Thus, under such conditions there is no movement of diaphragm 8 and the relatively small pressure range of transducer 5 cannot be exceeded, no matter what depth the body reaches. Upon reaching the desired depth, as may be indicated by another suitable depth transducer or by sonar contact, solenoid valve 16 is activated such as for example by closing switch 17. Compartment 12 will now be partially filled with water, the air or the like trapped between the water and diaphragm 8 providing an elastic medium which supplies a constant reference depth pressure on the reference side of diaphragm 8. For the case of an increase in depth, the increased static pressure in compartment 7 causes diaphragm 8 to flex outwardly with respect to compartment 7 as is shown in phantom in the drawing, thus causing contact element 9 to move rearwardly along resistor 11 as is also shown in phantom in the drawing. Transducer 5 is preferably so designed that a pressure equivalent to about a one-foot change in depth will cause diaphragm 8 to move sufficiently to operatively unbalance the Wheatstone bridge arrangement. If compartment 12 is properly designed as described previously, sufficient air volume will remain even at maximum depth that operation of diaphragm 8 in either direction will be substantially proportional to a change in depth. When the body deviates from its reference depth, diaphragm 8 will move due to the change in hydrostatic pressure thus causing contact element 9 to move to some new position on resistor 11. Since a difference of potential will now exist between contact element 9 and contact element 22 current will flow through wire 23 and coil 24. Even a small deviation of the original position of contact element 9 causes a current to flow in wire 23 sufficient to activate relay 30. One of the contacts 25—26 of relay 30 is thus closed by arm 27 whereupon the electric motor 31 is connected with the battery 29 so as to deflect rudder 32 such that the body will tend to move back toward its original and desired position. Simultaneously with the deflection of rudder 32 contact element 22 is also caused to be moved along resistor 19 by motor 31 such that the potential difference across coil 24 is again reduced to zero. When this occurs relay 30 will be de-energized thus removing the excitation current from motor 31 and causing it to stop. When the location of diaphragm 8 is again changed due to a change in hydrostatic pressure the above described procedure will be repeated. The direction in which the rudder is moved depends upon the direction of the current in wire 23 which in turn is determined by the movement of diaphragm 8 due to an increase or decrease in the ambient hydrostatic pressure. Relay 30 is therefore connected with wiring 28 in such a manner that the rudder is moved in such a direction as to cause the pressure on both sides of diaphragm 8 to be equalized. To this end the motor 31 includes two windings 33, 34, one causing the rotor to turn clockwise while the other causes the rotor to turn counter-clockwise.

In order to move from one operating depth to another, it is only necessary to remove the current from solenoid valve 16 thus causing it to open. The body is then allowed to assume a new operating depth, solenoid valve 16 is then closed again, and automatic operation of the system as described hereinabove is again resumed.

Where this system is used in a towed submersible body, switch 17 may be located in the towing vehicle, such as for example, a lighter than air airship or a ship, the connecting wires being attached to or contained in the towing cable. However, where this system is used in a self-propelled vehicle, switch 17 may be included in the vehicle and adapted to be operated automatically or intermittently as directed by other means such as for example, electric signals representative of an order for an upsteer or a downsteer from an acoustic homing panel.

Although this system has been described in detail it should be regarded as an illustration or example and not a restriction or limitation, as various changes may be made in the construction, combination, and arrangement of the parts without departing from the spirit and scope of the invention.

I claim:

1. In a control system for a submersible body having a rudder the combination comprising: first means responsive to the influence of hydrostatic pressure ambient of the body; a compartment associated with said first means and open to hydrostatic pressure ambient of the body, said compartment being so adapted that when the body is submerged a portion thereof will remain unfilled, said unfilled portion having a volume greater than the maximum volumetric displacement of said first means due to hydrostatic pressure; means operable to close off said compartment from hydrostatic pressure ambient of the body; and a second means responsive to actuation of said first means and the rudder to vary the position of the rudder.

2. In a control system for a submersible body having a rudder the combination comprising: first means responsive to the influence of hydrostatic pressure ambient of the body; a compartment in pressure responsive relation with said first means and open to hydrostatic pressure ambient of the body, said compartment being so adapted that when the body is operated at maximum depth a portion thereof will remain unfilled, said unfilled portion having a volume at least ten times greater than the maximum volumetric displacement of said first means due to hydrostatic pressure; second means operable to close off said compartment from hydrostatic pressure ambient of the body; and third means responsive to actuation of said first means and the rudder to vary the position of the rudder.

3. The combination as claimed in claim 2 wherein the first means responsive to the influence of hydrostatic pressure is volumetrically responsive and comprises a bellows open to the medium ambient of the body.

4. The combination as claimed in claim 2 wherein the means operable to close off the compartment from hydrostatic pressure ambient of the body comprises an electrically operated valve; a switch; and a source of electric current.

5. In a control system for a submersible body having a rudder the combination comprising: first means responsive to the influence of hydrostatic pressure ambient of the body; a compartment in pressure responsive relation with said first means and open to the medium ambient of the body, second means operable to close off said compartment from the medium ambient of the body; and third means to vary the position of the rudder, said third means being operable upon actuation of said first means and comprising an electrically controlled reversible motor adapted to be coupled to said rudder for shifting the position of said rudder, a source of current and wiring forming a circuit for said electrically controlled motor, and a regulator for reversing the direction of the current in said electric circuit.

6. A pressure error sensing transducer for use in a rudder control system for submersible bodies comprising: means responsive to the influence of hydrostatic pressure ambient of the body; a compartment in pressure responsive relation with said means and open to hydrostatic pressure ambient of the body, said compartment being so adapted that when the body is submerged a portion thereof will remain unfilled, said unfilled portion having a volume greater than the maximum volumetric displacement of said first means due to hydrostatic pressure; and means operable to close off said compartment from hydrostatic pressure ambient of the body.

7. A pressure error sensing transducer for use in a rudder control system for submersible bodies comprising: a compartment having a first end portion and a second end portion, said first end portion being adapted to be filled with a liquid and having mounted therein means responsive to the influence of hydrostatic pressure ambient of the body, said second end portion being open to the medium ambient of the body and having a volume such that when the body is being operated at the maximum desirable depth a portion thereof will remain unfilled, said unfilled portion having a volume at least about ten times greater than the maximum volumetric displacement of said first means due to hydrostatic pressure; a resilient diaphragm sealably separating said end portions; and valve means operable to close off said second end portion from said medium ambient of the body.

8. In a control system for a submersible body having a rudder the combination comprising: pressure error sensing means, said means comprising a compartment having a first end portion and a second end portion, a resilient diaphragm sealably separating said end portions, first means responsive to the influence of hydrostatic pressure ambient of the body mounted in one end portion, the remaining volume of said end portion being filled with an inert liquid, the other end portion being open to the medium ambient of the body and having a volume such that when the body is being operated at the maximum desirable depth a portion thereof will remain unfilled, said unfilled portion having a volume at least about ten times greater than the maximum volumetric displacement of said first means due to hydrostatic pressure; second means operable to close off from the medium ambient of the body said end portion open to said medium; and third means responsive to actuation of said first means and the rudder to vary the position of the rudder.

9. In a control system for a submersible body having a rudder the combination comprising: pressure error sensing means, said means comprising a compartment having a first end portion and a second end portion, a resilient diaphragm sealably separating said end portions, first means responsive to the influence of hydrostatic pressure ambient of the body mounted in one end portion, the remaining volume of said end portion being filled with an inert liquid, the other end portion being open to the medium ambient of the body and having a volume such that when the body is being operated at the maximum desirable depth a portion thereof will remain unfilled, said unfilled portion having a volume at least about ten times greater than the maximum volumetric displacement of said first means due to hydrostatic pressure; second means operable to close off from the medium ambient of the body said end portion open to said medium; and third means to vary the position of the rudder, said third means being operable upon movement of said first means and comprising an electrically controlled reversible motor adapted to be coupled to said rudder for shifting the position of said rudder, a source of current and wiring forming a circuit for said electrically controlled motor, and a regulator for reversing the direction of the current in said electric circuit.

10. A pressure error sensing transducer for use in a rudder control system for submersible bodies comprising: a first compartment open to hydrostatic pressure ambient of the body and adapted to be filled with a liquid, a second compartment in pressure responsive relationship with said first compartment and open to hydrostatic pressure ambient of the body; a diaphragm sealably separating said first and second compartments; means connected to said diaphragm and responsive to movement of the diaphragm; and valve means operable to close off said second compartment from the medium ambient of the body.

References Cited in the file of this patent

UNITED STATES PATENTS

| | | |
|---|---|---|
| 466,128 | Rung | Dec. 29, 1891 |
| 2,276,580 | Hafer | Mar 17, 1942 |
| 2,598,932 | Natho | June 3, 1952 |
| 2,604,065 | Elmer | July 22, 1952 |
| 2,635,581 | Karig | Apr. 21, 1953 |